United States Patent
Ofri et al.

(10) Patent No.: US 8,250,919 B2
(45) Date of Patent: Aug. 28, 2012

(54) VIBRATORY GYROSCOPIC DEVICE FOR DETERMINING ANGULAR VELOCITY

(76) Inventors: Atzmon Ofri, Mazkeret Batya (IL);
Daniel Wormser, Gedera (IL);
Mordekhai Velger, Rehovot (IL);
Yizhar Weiss, Rishon le Ziyon (IL);
Boris Berg, Rishon le Ziyon (IL)

(*) Notice: Subject to any disclaimer, the term of this patent is extended or adjusted under 35 U.S.C. 154(b) by 470 days.

(21) Appl. No.: 12/527,174

(22) PCT Filed: Feb. 13, 2008

(86) PCT No.: PCT/IL2008/000190
§ 371 (c)(1),
(2), (4) Date: Aug. 13, 2009

(87) PCT Pub. No.: WO2008/099395
PCT Pub. Date: Aug. 21, 2008

(65) Prior Publication Data
US 2010/0107761 A1    May 6, 2010

(30) Foreign Application Priority Data
Feb. 15, 2007    (IL) .......................... 181367

(51) Int. Cl.
*G01P 9/04*    (2006.01)
*G01C 19/56*    (2006.01)
(52) U.S. Cl. .................................. 73/504.13
(58) Field of Classification Search .............. 73/504.13, 73/504.12, 504.04, 514.15
See application file for complete search history.

(56) References Cited

U.S. PATENT DOCUMENTS

| 5,450,751 | A | | 9/1995 | Putty et al. | |
|---|---|---|---|---|---|
| 5,650,568 | A | * | 7/1997 | Greiff et al. | 73/504.09 |
| 6,276,205 | B1 | * | 8/2001 | McNie et al. | 73/504.13 |
| 6,282,958 | B1 | | 9/2001 | Fell et al. | |
| 6,308,567 | B1 | * | 10/2001 | Higuchi et al. | 73/504.12 |
| 6,901,799 | B2 | * | 6/2005 | Chen et al. | 73/504.13 |
| 7,100,446 | B1 | * | 9/2006 | Acar et al. | 73/504.13 |
| 7,155,976 | B2 | * | 1/2007 | Kai-Cheng et al. | 73/504.04 |
| 7,155,978 | B2 | * | 1/2007 | Lo et al. | 73/504.13 |
| 7,360,423 | B2 | * | 4/2008 | Ayazi et al. | 73/504.12 |
| 7,637,156 | B2 | * | 12/2009 | Araki et al. | 73/504.13 |
| 7,908,922 | B2 | * | 3/2011 | Zarabadi et al. | 73/504.13 |

FOREIGN PATENT DOCUMENTS
WO    WO/03025505    3/2003

OTHER PUBLICATIONS

Farrokh Ayazi et al.: "A HARPSS Polysilicon Vibrating Ring Gyroscope" Journal of Microelectromechanical Systems, IEEE Service Center, Piscataway, NJ, U.S., vol. 10, No. 2, Jun. 1, 2001, pp. 169-179.

* cited by examiner

*Primary Examiner* — Helen C. Kwok
(74) *Attorney, Agent, or Firm* — SNR Denton US LLP; Adam C. Rehm (57) ABSTRACT

A vibratory gyroscopic device to determine the rotation rate of an object and method of manufacturing thereof, the device including a plurality of supporting springs arranged in pairs to exhibit bilateral symmetry via each pair (i.e., mirror-image symmetry) relative to each other such that the asymmetries in the characteristics of the ring (e.g., resonant frequency, response to angular velocity), caused by asymmetries in the structure of the ring, are reduced.

33 Claims, 10 Drawing Sheets

VIBRATORY GYROSCOPIC DEVICE FOR DETERMINING ANGULAR VELOCITY

CROSS-REFERENCE TO RELATED APPLICATIONS

This application claims priority to and is a United States National Stage application of Patent Cooperation Treaty Application No. PCT/IL2008/000190 filed Feb. 13, 2008, the disclosure of which is incorporated herein by reference in its entirety. This application also claims priority to Israel Patent Application 181367 filed Feb. 15, 2007, the disclosure of which is also incorporated herein by reference in its entirety.

FIELD OF THE INVENTION

The disclosed technique relates to rotational sensors in general, and to vibratory gyroscopic devices, and methods for manufacturing thereof, in particular.

BACKGROUND OF THE INVENTION

Determining the angular rotation rate of a rotating body plays an important role in navigation guidance and control systems. For example, in Inertial Navigation System (INS), it is required to determine the angular accelerations of a vehicle and, thus, the angular orientations thereof. Determining the angular rotation rate may further allow, for example, determining the linear acceleration of a wheeled vehicle (e.g., by attaching an angular velocity sensor to a wheel).

When a mass moves on a rotating body, toward or away from the axis of rotation, a force is exerted perpendicular to the direction of motion. This force is known as the Coriolis force. The magnitude of the Coriolis force is proportional to the angular rotation rate of the body. Thus, the angular rate of rotation (i.e., angular velocity) can be determined by measuring the Coriolis force.

A vibratory gyroscope is a device for determining the angular rotation rate of a body by measuring the Coriolis force. A vibratory gyroscope includes a planar ring suspended by beams coupled with a central support above a substrate. These beams function as springs in any ring-plane (i.e., lateral) direction. Thus, the ring is free to oscillate in any ring-plane direction. It is noted that the ring may oscillate in out of ring-plane directions as well. However, the out of ring-plane oscillation frequencies are substantially higher than the in-plane oscillation frequency.

Figure 1A:
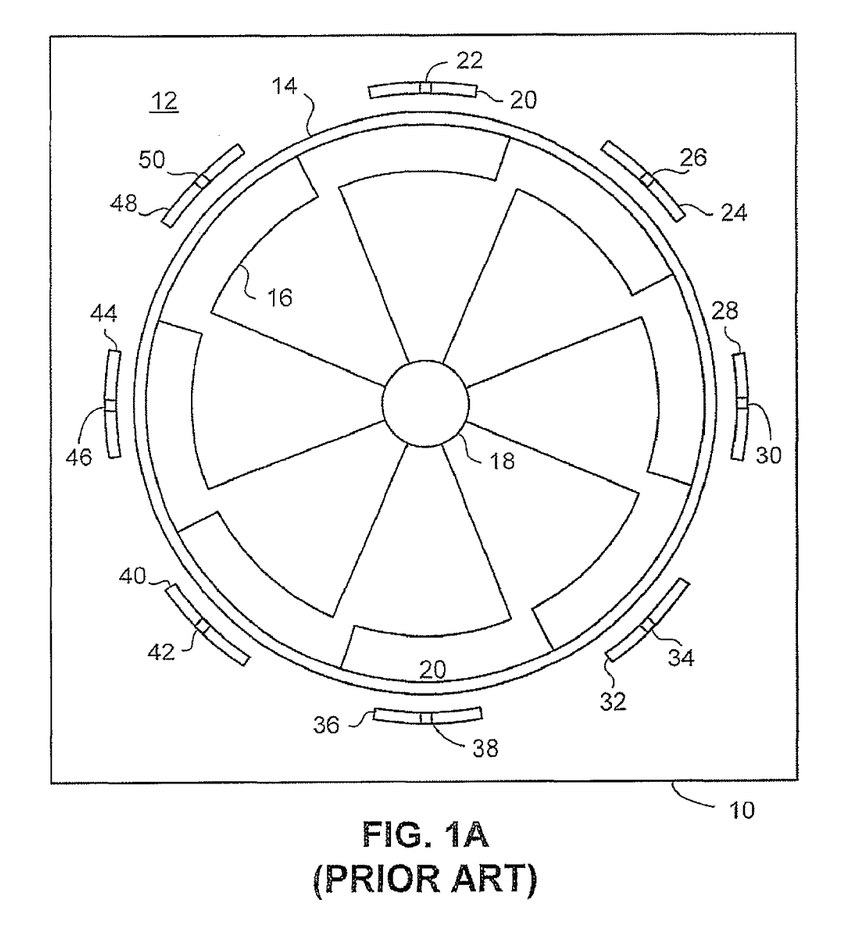
FIG. 1A, FIG. 1B and FIG. 1C, are schematic illustrations of a vibratory gyroscope generally referenced 10, which is known in the art.
Figure 1B:
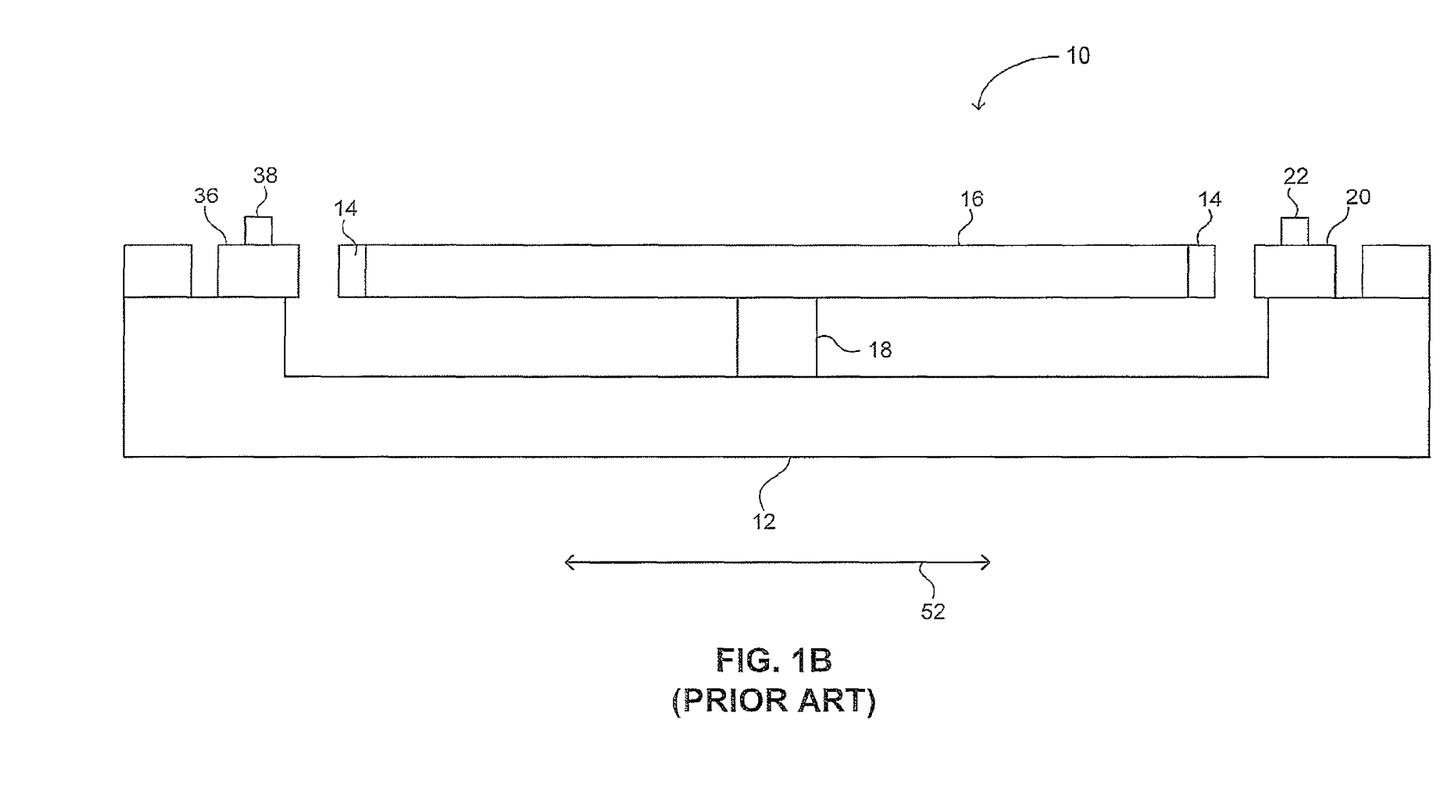
Figure 1C:
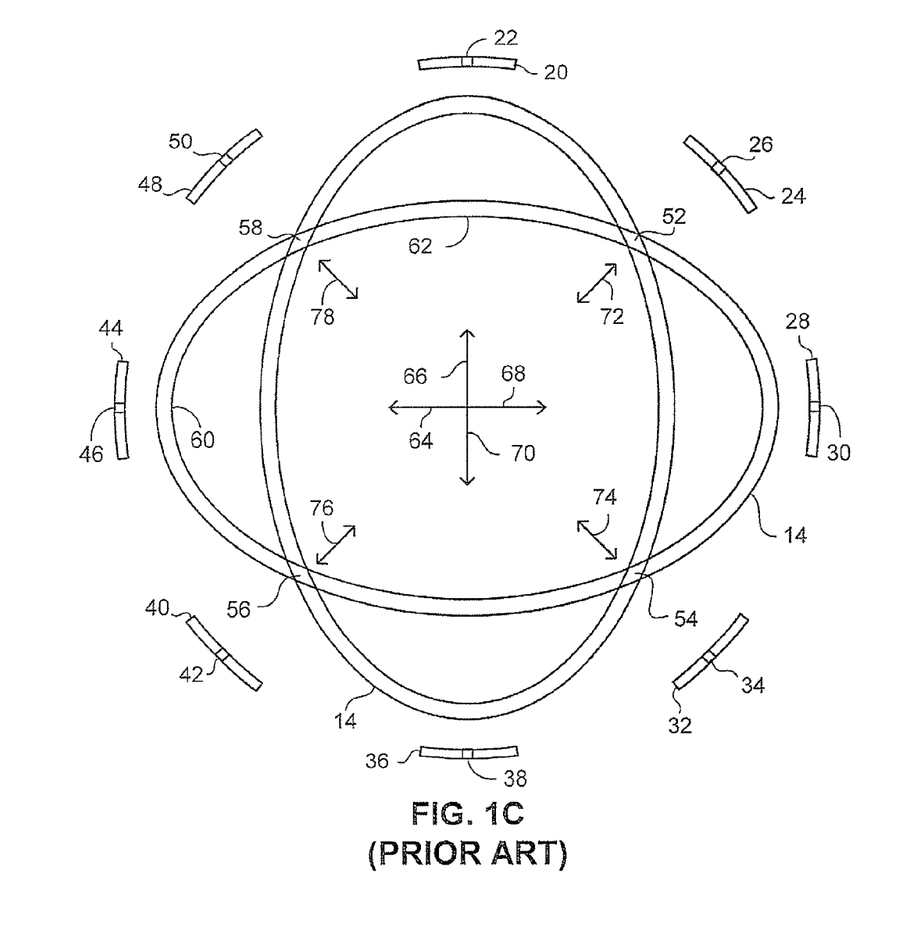

Reference is now made to FIG. 1A, to FIG. 1B and to FIG. 1.C, which are schematic illustrations of a vibratory gyroscope generally referenced 10, which is known in the art. Vibratory gyroscope 10 includes a ring 14, a plurality of beams 16 and a central support 18. Central support 18 is an integral part of a substrate 12. Beams 16 couple ring 14 to central support 18. It is noted that beams 16 are coupled only with ring 14 and central support 18, thus, ring 14 and beams 15 are suspended above substrate 12 as shown in FIG. 1B. Beams 16 function as springs in a ring-plane direction, represented by arrows 52. Consequently, ring 14 is free to oscillate in any lateral direction represented by arrows 52.

Vibratory gyroscope 10 further includes capacitive actuators 20, 28, 36 and 44, and capacity sensors 24, 32, 40 and 48. Capacitive actuators 20, 28, 36 and 44 and capacity sensors 24, 32, 40 and 48 are capacitively coupled with ring 14. Bond pads 22, 26, 30, 34, 38, 42, 46 and 50 are coupled with capacitive actuators 20, 28, 36 and 44, capacity sensors 24, 32, 40 and 48, respectively and with external circuitry (not shown). Capacitive actuators 20 and 36 are placed opposite each other on an axis that passes through the center of ring 14. Capacitive actuators 28 and 44 are placed on an axis that passes through the center of ring 14 and that is perpendicular to the axis of capacitive actuators 20 and 32. Capacity sensors 24, 32, 40 and 48 are placed in a similar way to capacitive actuators 20, 28, 36 and 44 although the axes of capacity sensors 24, 32, 40 and 48 are at a forty five degree angle relative to the axes of the capacitive actuators 20, 28, 36 and 44.

In operation, capacitive actuators 20, 28, 36 and 44 are pulsed at the resonant frequency of ring 14. Capacitive actuators 20 and 36 are pulsed in phase with each other. Capacitive actuators 28 and 44 are pulsed in phase with each other and out of phase with capacitive actuators 20 and 36. Consequently, an electric field, and thus an electric force is formed between each of capacitive actuators 20, 28, 36 and 44 and ring 14. Thus, ring 14 vibrates in the direction of arrows 64, 66, 68 and 70. This vibration will be referred to hereinafter as "elliptic mode vibration". The natural frequency of the elliptic mode vibrations will be referred to hereinafter as "elliptic mode frequency". Furthermore, hereinafter, when the ring is in the elliptic mode vibration, the ring is said to "elliptically vibrate". When no other forces, other than the electric force, act on ring 14 (i.e., the ring elliptically vibrates), four nodes 52, 54, 53, and 58 are formed on the perimeter of ring 14, whereat the ring substantially does riot move. It is noted that capacity sensors 24, 32, 40 and 48 are placed in proximity to nodes 36, 38, 40 and 42, respectively.

When the ring rotates, a Coriolis force acts on ring 14. Consequently, nodes 52, 54, 56, and 58 radially vibrate at an amplitude proportional to the rate of rotation, and the capacitance between the ring and capacity sensors 24, 32, 40 and 48 changes accordingly. Capacitive sensors 24, 32, 40 and 48 sense this change in capacitance. According to this change in capacitance, it is possible to determine the Coriolis force, and hence the rate of rotation of ring 14.

U.S. Pat. No. 5,225,231, to Varnham et al, entitled "Vibrating Planar Gyro", directs to a vibrating planar ring or hoop-like structure suspended in space by a suitable support mount for detecting turning rate, linear acceleration and angular acceleration. Turning rate is sensed by detecting vibrations coupled by Coriolis forces. The linear acceleration and the angular acceleration are sensed by lateral, vertical and rocking movement of the entire ring or hoop-like structure, within the mount thereof. The resonator (i.e., the vibrating structure) is formed on a center plate and lies between an upper plate and a lower plate. The resonator is formed of a stable material such as glass, silicon or quartz wafer or sheet. The upper and the lower plates may be formed of glass, quartz or fused silica.

Two sets of transducers are located above and below the resonator, respectively. Each transducer includes two sets of concentric electrode strips, one set located on the upper or lower surface of the resonator, and the other set located on the upper or lower plates. Each transducer produces an output signal which is representative of the distance between its respective sets of the electrode strips. Two transducers excite the resonator at a resonate frequency along a determined primary axis in the plane of the resonator. The output of the transducers gives an indication of acceleration and turning rate.

U.S. Pat. No. 5,450,751, to Putty et al., entitled "Microstructure for Vibratory Gyroscope", directs to a microstructure for a vibratory gyroscope of the variety sensing rotation about an axis. Eight, equally distributed semicircular or "S" shaped spokes couple a ring to a hub. The hub is coupled to a silicon substrate base. The spokes and the rings are free standing away from the base.

A multiplicity of charge conductive sites is disposed symmetrically around the outer perimeter of the ring and adjacent thereto. The arrangement of charge conductive sites adequate drive and detection of a resonant standing wave pattern in the ring. The Base may also includes prefabricated circuitry as a monolithic integrated circuit, a portion of which may be ohmically coupled to the microstructures via exposed metallization sites.

In the publication to Putty et al., it is desirable to increase the height and the diameter of the ring and to decrease the width of the ring. Consequently, the natural (i.e., the resonant) frequency of the ring is decreased, yielding increased sensitivity of the ring. However, the natural frequency of the ring should by kept below out-of-plane natural frequencies and above the frequencies of external vibrations (e.g., the vibrations of a motor vehicle when sensing rotations in this motor vehicle).

In the publication to Putty et al., the microstructure (i.e., the ring and the spokes) is formed by constructing a mold from polyimide on a passivation layer made of silicon nitride of oxide. When the mold is in place, a barrett sultamate nickel process is used to form a nickel microstructure. When the mold and the passivation layer are removed, the microstructure is left freestanding.

U.S. Pat. No. 6,282,958, to Fell at al., entitled "Angular Rate Sensor", directs to an angular rate sensor suitable for sensing motion about at least one axis. The angular rate sensor to Fell et al. includes a resonator having a ring or hoop-like shape structure, flexible support beams, a boss and a base. The boss is coupled with the base. The flexible support beams couple the ring structure with the boss, so that the ring resonator structure is spaced from the boss and the base. The angular rate sensor further includes electrostatic drive means for causing the resonator to vibrate at cos(20) carrier mode, and electrostatic sensing means for sensing movement of the resonator. When the sensor is rotated about the Z axis, Coriolis force couples energy into the response mode with amplitude and it is directly proportional to the applied rotation rate. This motion is sensed by the sensing means (i.e., pick-off elements).

According to the publication to Fell et al., the ratio of the lateral thickness of the resonator, to the width between the outer periphery of the resonator and an adjacent drive or pick-off element must be between 10:1 to 40:1 to maximize the capacitance between the resonator and the electrostatic elements.

U.S. Pat. No. 6,471,883, to Fell et al., entitled "Method of Manufacturing a Vibrating Structure Gyroscope", directs to a method of manufacturing a vibrating structure gyroscope having a silicon substantially planar ring vibrating structure and capacitive means for imparting drive motion to, and sensing motion of the vibrating structure. The silicon vibrating structure includes a substantially planar ring resonator, support legs and a central hub. The support legs couple the resonator with the central hub. The hub is coupled with a plate like glass or silicon substrate. Thus, the resonator structure mounted by a hub above the substrate cavities provides unrestricted oscillation of the ring structure. The gyroscope includes capacitive drive means for imparting drive motion to the ring resonator and capacitive sensing means for sensing and picking off motion of the ring resonator.

The method according to the publication to Fell et al., includes the steps of: depositing a first layer of photoresist material onto one surface of the plate like glass or silicon substrate and exposing selected areas of the substrate. Etching the exposed areas of the substrate to form cavities therein and stripping the remaining first layer photoresist material from the cavitated substrate. Attaching a layer of silicon to the cavitated substrate. Depositing a layer of aluminum on the surface of the silicon layer. Depositing a second layer of photoresist material on to the outermost surface of the aluminum layer with respect to the silicon layer and exposing selected areas of the aluminum layer. Etching said exposed areas of the aluminum layer to leave on the silicon layer regions of aluminum providing bond pads for grounding the screen layer, bond pads forming connection points for the capacitive drive and sensing means, and bond pads for electrical connection to the silicon substantially planar ring vibrating structure. Depositing a third layer of photoresist material onto the silicon layer over the remaining deposited aluminum layer regions and exposing selected areas of the silicon layer. Performing deep reactive ion etching of the exposed selected areas of the silicon layer to form, from the silicon layer, the capacitive drive and sensing means, and electrically isolating each of the capacitive drive and sensing means, screen layer and ring vibrating structure from one another.

SUMMARY OF THE INVENTION

It is an object of the disclosed technique to provide a novel vibratory gyroscopic device and a method for manufacturing thereof.

In accordance with the disclosed technique, there is thus provided a latching assembly for decreasing the aspect ratio between a capacitive sensor and a ring in a vibratory gyroscopic device. The device includes a substrate, the ring, at least one capacitive actuator and at least one capacitive sensor, a central support and a plurality of support springs. The central support has a diameter smaller than the diameter of the ring. The central support is coupled with said the substrate. The support springs are coupled with the central support and with the ring. The at least one capacitive actuator is coupled with the substrate and capacitively coupled with said the ring. The at least one capacitive actuator applies an oscillating electric force on said the ring. The frequency of the oscillating electric force is the elliptic mode frequency of said the ring. The capacitive sensor is capacitively coupled with the ring. The capacitive sensor senses the changes in capacitance between the ring and said the at least one capacitive sensor. The assembly includes a movable frame. The movable frame is coupled with the capacitive sensor. The movable frame latches from a manufacturing configuration to an operating configuration, in response to a force applied thereto. The aspect ratio at the manufacturing configuration is lower than the aspect ratio at the operating configuration.

In accordance with another aspect of the disclosed technique, there is thus provided a vibratory gyroscopic device. The vibratory gyroscopic device includes a substrate, a central support, a ring a plurality of supporting springs, at least one capacitive actuator, at least one capacitive sensor and a movable frame. The central support is coupled with the substrate. The ring has an inner diameter larger than the diameter of said central support. The plurality of supporting springs are coupled with the central support and with the ring. The at least one capacitive actuator' is coupled with said substrate and capacitively coupled with said ring. The at least one capacitive sensor is capacitively coupled with said ring. The movable frame is coupled with said capacitive sensor. The at least one capacitive actuator applies an oscillating electric force on said ring. The frequency of said oscillating electric force is the elliptic mode frequency of said ring. The at least one capacitive sensor, senses are the changes in capacitance between the ring and the at least one capacitive sensor. The movable frame latches from a manufacturing configuration to an operating configuration, in response to a force applied thereto. The aspect ratio at the manufacturing configuration is lower than the aspect ratio at the operating configuration.

In accordance with a further aspect of the disclosed technique, there is thus provided a method for manufacturing a vibratory gyroscopic device. The method includes the procedures of etching a ring shaped cavity into a substrate slab, depositing a layer of metal onto said cavity and attaching a fabrication material slab to said substrate slab. The method further includes the procedures of creating chromium-gold pads onto said fabrication slab and etching a ring, a plurality of rings, a central support, at least one capacitive actuator, at least one capacitive sensor and at least one latching assembly from said fabrication material.

BRIEF DESCRIPTION OF THE DRAWINGS

The disclosed technique will be understood and appreciated more fully from the following detailed description taken in conjunction with the drawings in which.

DETAILED DESCRIPTION

The disclosed technique overcomes the disadvantages of the prior art by providing a vibratory gyroscopic device for determining the rotation rate of an object, and a method for manufacturing this device. According to the disclosed technique, a plurality of supporting springs couple a ring with a central support. The supporting springs are arranged in pairs. The supporting springs in each pair of springs exhibit bilateral symmetry (i.e., mirror-image symmetry) relative to each other. Thus, asymmetries in the characteristics of the ring (e.g., resonant frequency, response to angular velocity), caused by asymmetries in the structure of the ring, are reduced. Consequently, the elliptic mode resonant frequency of the ring is closer to the elliptic mode resonant frequency of a "floating" ring (i.e., a ring that is not mechanically supported). Each of the supporting springs is generally in the shape of the letter "L". One leg of a supporting spring is coupled with a central support. A stub, extending perpendicular to the other leg, couples this other leg with the ring. The ratio between the leg coupled to the central support to the stub is high (e.g., substantially 30:1). Furthermore, the ratio between the height of the spring and the width of the spring is high (e.g., substantially 100:15). Consequently, the effect of the springs on the resonant frequency of the ring is reduced.

Increasing the ratio between the height of the ring, and the height of each of the capacitive sensors, to the distance between the ring and the capacitive sensors, increases the capacitance between the ring and each of the capacitive sensors. Thus, the sensitivity of the capacitive sensors is also increased. The ratio between the height of the ring and the height of the capacitive sensor, to the distance between the ring and the capacitive sensors, will be referred to hereinafter as "aspect ratio". According to the disclosed technique, the aspect ratio is substantially 50:1.

In order to achieve the desired aspect ratio, each capacitive sensor is coupled with a movable frame. The movable frame latches from a manufacturing configuration to an operating configuration, in response to a force applied thereto. A locking mechanism may secure the movable frame at the operating configuration. At the operating configuration, the aspect ratio is higher the aspect ratio at the manufacturing configuration (i.e., the distance of the capacitive sensor from the ring at the operating configuration is smaller than the distance of the capacitive is sensor from the ring at the manufacturing configuration). For example, the movable frame has at least one locking cavity. Frame springs couple the movable frame with a silicon slab. A locking spring couples at least one locking element with the silicon slab. When the movable frame moves toward the center of the ring (i.e., when a force is applied thereto), the locking element slides into the locking cavity. Thus, the movable frame is firmly locked into place. Consequently, it is possible to manufacture a vibratory gyro with a small aspect ratio, and increase the aspect ratio after the manufacturing process (i.e., by employing the locking mechanism). The method of manufacturing will be discussed in conjunction with FIG. 4.

Figure 2A:
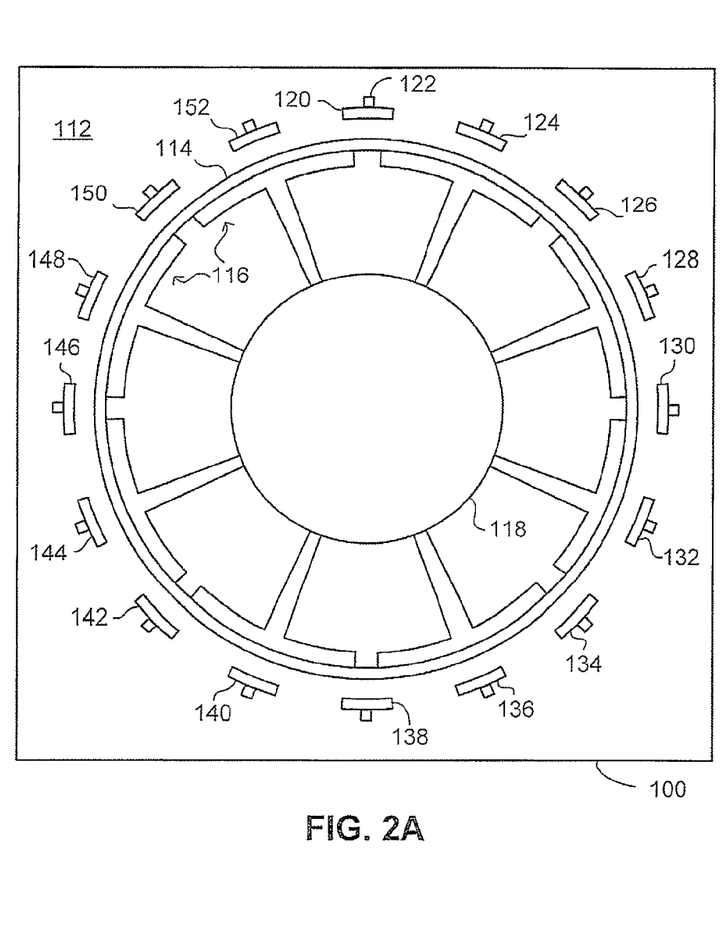
FIG. 2A is a schematic illustration of a vibratory gyroscopic device, generally referenced 100, constructed and operative in accordance with an embodiment of the disclosed technique.

Reference is now made to FIG. 2A is a schematic illustration of a vibratory gyroscopic device, generally referenced 100, constructed and operative in accordance with an embodiment of the disclosed technique. Device 100 includes a substrate 112, a ring 114, eight pairs of supporting springs 116 and a central support 118. Device 100 further includes capacitive actuators 146 and 142, capacitive sensor 126 and 130, compensating electrodes 134, 136, 138 and 140, grounded electrodes 120, 124, 128, 132, 144, 148, 150 and 152, and a plurality of bond pads such as bond pad 122.

The eight pairs of supporting springs 116 couple ring 114 with central support 118. A bond pad, such as bond pad 122, couples external circuitry (not shown) with each of capacitive actuators 146 and 142, capacitive sensors 126 and 130, compensating electrodes 134, 136, 138 and 140, and grounded electrodes 120, 124, 128, 132, 144, 148, 150 and 152. It is noted, that the springs of each pair of supporting springs 116, exhibit bilateral symmetry with respect to each other. Thus, as explained above, the elliptic mode resonant frequency of the ring is closer to the elliptic mode resonant frequency of a "floating" ring. It is further noted, that each pair of supporting springs exhibits rotational symmetry with respect to each of the other pairs. It is noted that the term "capacitive sensor" refers to an electrode, capacitively coupled with the outer perimeter of ring 114. Capacitive sensor is also referred to as "pick-off electrode."

Figure 2B:
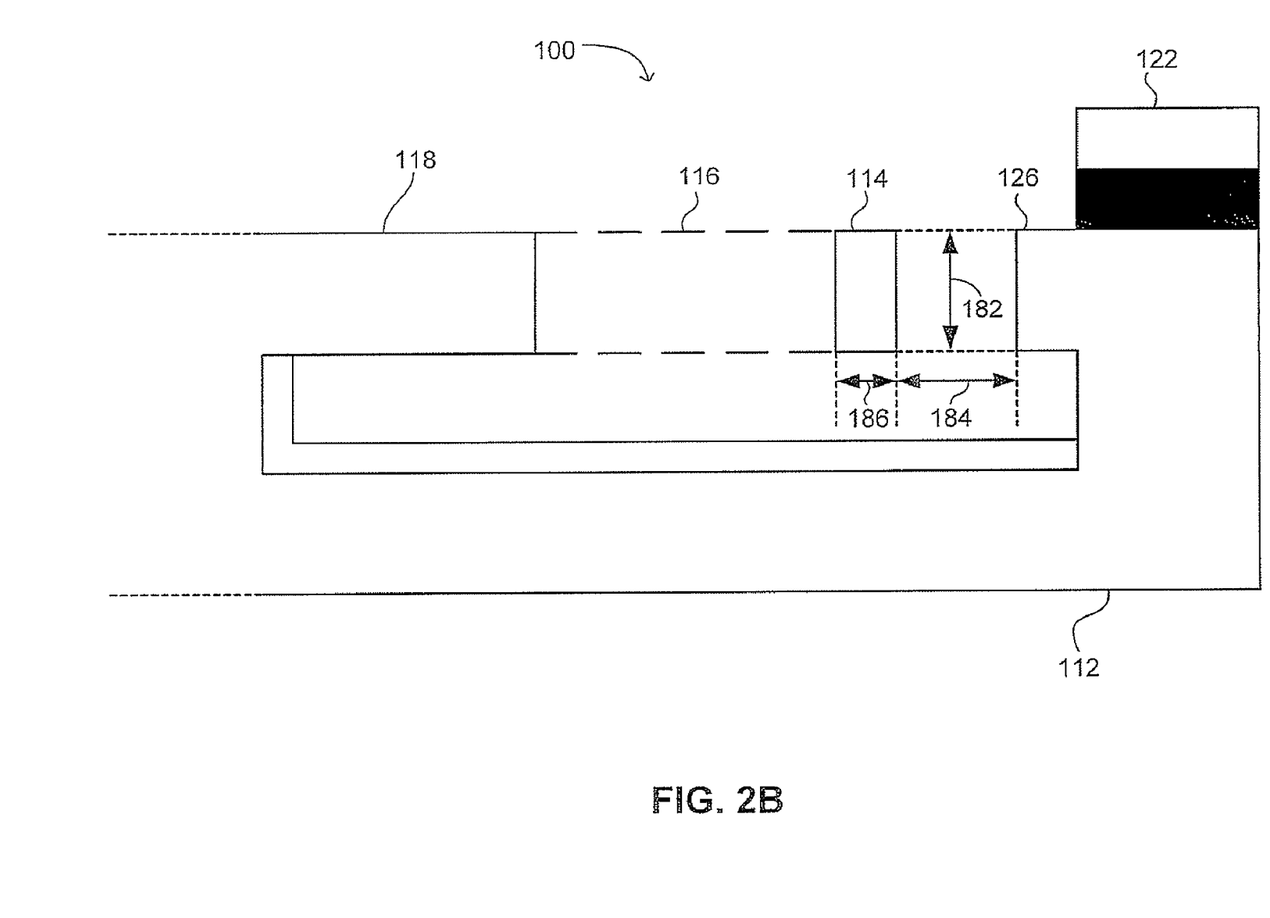
FIG. 2B is a schematic illustration of part of a vertical cross section of gyroscopic device 100.

Reference is now made to FIGS. 2A and 2B. FIG. 2B is a schematic illustration of part of a vertical cross section of gyroscopic device 100. Ring 114, eight pairs of supporting springs 116, a central support 118, capacitive actuators 146 and 142, capacitive sensors 126 and 130, compensating electrodes 134, 136, 138 and 140, grounded electrodes 120, 124, 128, 132, 144, 148, 150 and 152 are all fabricated from the same fabrication material (e.g., silicon) slab. The fabrication material is coupled with substrate 112, which may be made of a glass wool, namely fibers and/or filaments of glass, such as PYREX®. Bond pads, such as bond pad 122, are typically chromium-gold bond pads.

Figure 2C:
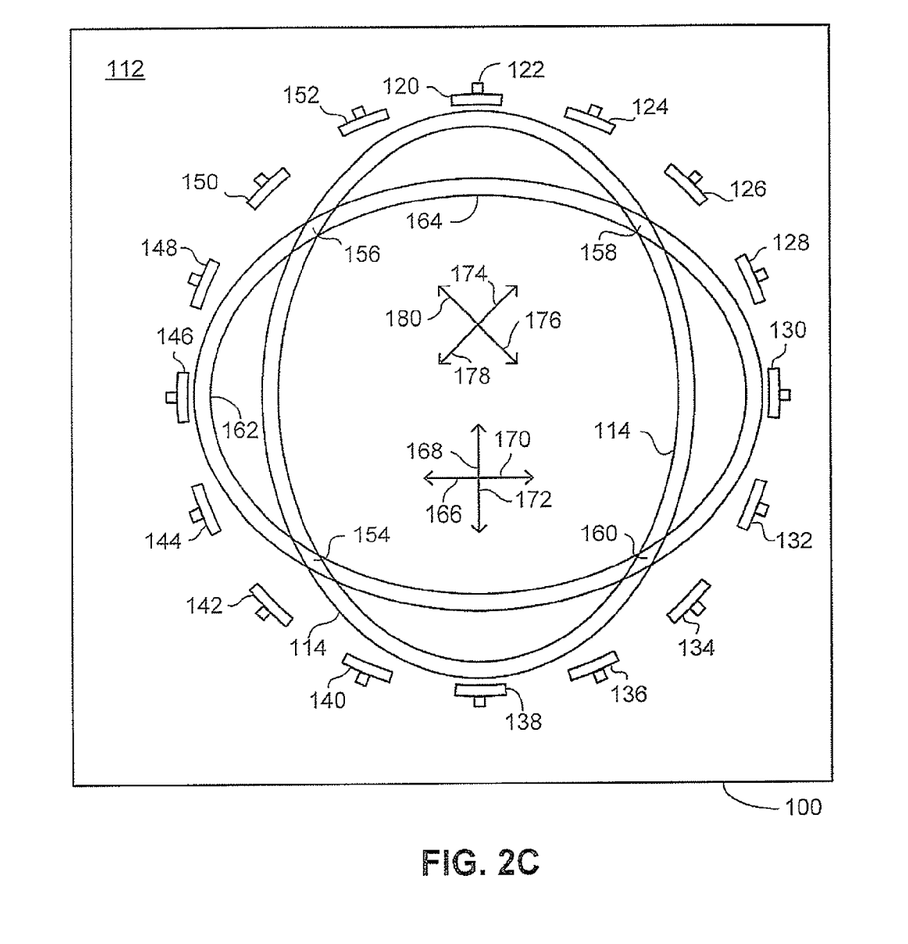
FIG. 2C is another schematic illustration of vibratory gyroscopic device 100 in operating mode.

Reference is now made to FIGS. 2A, 2B and 2C. FIG. 2C is another schematic illustration of vibratory gyroscopic device 100 in operating mode. During the operation of vibratory gyroscopic device 100, external circuitry (not shown) applies a polarization voltage to ring 114. This polarization voltage creates a bias charge in capacitive actuators 146 and 142, capacitive sensor 126 and 130, compensating electrodes 134, 136, 138 and 140, and in grounded electrodes 120, 124, 128, 132, 144, 148, 150 and 152. The external circuitry further provides an alternating voltage to capacitive actuator 146. The frequency of this alternating voltage is the elliptic mode frequency of ring 114. Thus, capacitive actuator 146 applies an alternating electric force to ring 114 in the directions designated by arrows 170 and 166. Consequently, ring 114 elliptically vibrates at the elliptic mode frequency thereof (i.e., ring 114 elliptically vibrates in the direction of arrows 170 and 166 and in the directions of arrows 168 and 172). When ring 114 elliptically vibrates, the capacitance between capacitive sensor 130 and ring 114 changes according to this vibration (i.e., due to the change in the distance there between). Capacitive sensor 130 senses these changes in capacitance, and the external control loop circuitry (not shown) determines the amplitude and frequency of the vibrations of ring 114. This external control loop circuitry further determines correction factors of the alternating voltage applied to capacitive actuator 146, when the determined amplitude and frequency of the vibration of ring 114 deviate from the desired values (i.e., the elliptic mode frequency of ring 114).

When ring 114 elliptically vibrates at the resonant frequency thereof, and vibratory gyroscopic device 100 does not rotate, four nodes 154, 156, 158 and 160, that exhibit substantially no motion, are formed on the perimeter of ring 114. When vibratory gyroscopic device 100 rotates (e.g., in a counter-clockwise direction), an oscillating Coriolis force acts on ring 114. This Coriolis force effectively transfers energy from one axis of radial vibration to an axis perpendicular to that axis of radial vibration. Accordingly, every point element on the ring is subjected to a force which is the vector sum of the elliptic vibration of that point element, and the vibration due to the Coriolis force acting on that same point element.

Thus, for example, the force acting on anti-node 164 (i.e., a node that exhibits maximum motion along the ring), is in the directions of arrows 174 and 178. As a consequence of this motion of every point element of the ring, node 156 and node 160 radially vibrate in the directions of arrows 176 and 180. Furthermore, nodes 154 and node 158 vibrate in the directions of arrows 174 and 178 (i.e., according to the vector sum of the forces acting on ring 114).

The radial oscillation, for example, of node 158, changes the capacitance between node 158 and capacitive sensor 126. Capacitive sensor 126 detects this change in capacitance. According to this change in capacitance, external circuitry (not shown) determines the force acting on node 158. Consequently the external circuitry determines the magnitude of the Coriolis force acting on ring 114 and hence, the rate of rotation of vibratory gyroscopic device 100.

When vibratory gyroscopic device 100 is subjected to a high frequency of angular motion, nodes 154, 156, 158 and 160 may be slow to respond to the changes in the magnitude of the Coriolis force. Thus, the changes in the capacitance of capacitive sensor 126 may not necessarily correspond to the changes in the Coriolis force. In order to decrease the response time of nodes 154, 156, 158 and 160, to the changes in the angular velocity of vibratory gyroscopic device 100, the external control circuitry applies voltage to capacitive actuator 142, corresponding to the changes detected by capacitive sensor 126. This voltage causes capacitive actuator 142 to apply a radial force, opposing the radial vibration of node 158. Thus, capacitive actuator 142 substantially rapidly (i.e., relative to the point in time when the vibration started) nulls the radial vibration in the directions of arrow 174. The magnitude of the Coriolis force, and consequently the angular velocity, is determined according to the voltage applied to capacitive actuator 142. Since the radial vibration in the directions of arrow 174 is substantially rapidly nulled, the time of the mechanical response of the ring 114, due to changes in the Coriolis force, is substantially decreased (i.e., the ring does not have to transit from one amplitude of oscillation to another). The Coriolis force is determined by measuring the voltage the external control circuitry applies to capacitive actuator 142.

Grounded electrodes 120, 124, 128, 132, 144, 148, 150 and 152, are all connected to ground. However, since a polarization voltage is applied to ring 114, a force between ring 114 and grounded electrodes 120, 124, 128, 132, 144, 148, 150 and 152 is created. This force prevents the translational motion of the ring during the activation of the ring (i.e., to prevent motion of the entire ring in any ring-plane direction). Thus, the force between ring 114 and grounded electrodes 120, 124, 128, 132, 144, 148, 150 and 152 contributes to the substantially symmetric motion (i.e., elliptic vibration) of ring 114.

Ring 114 may be an imperfect ring (e.g., ring 114 may have an inconstant radius, inconstant width). Thus, the characteristics of the ring (e.g., resonant frequency, response to angular velocity) may deviate from optimal values. To compensate for these deviations, the external circuitry (not shown) applies a balancing voltage to compensating electrodes 134, 136, 138 and 140. Thus, compensating electrodes 134, 136, 138 and 140 apply an electric force on ring 114. This electric force counters the deviations in motion of ring 114. Consequently, the motion of ring 114 is substantially similar to that of a perfect ring.

Figure 2D:
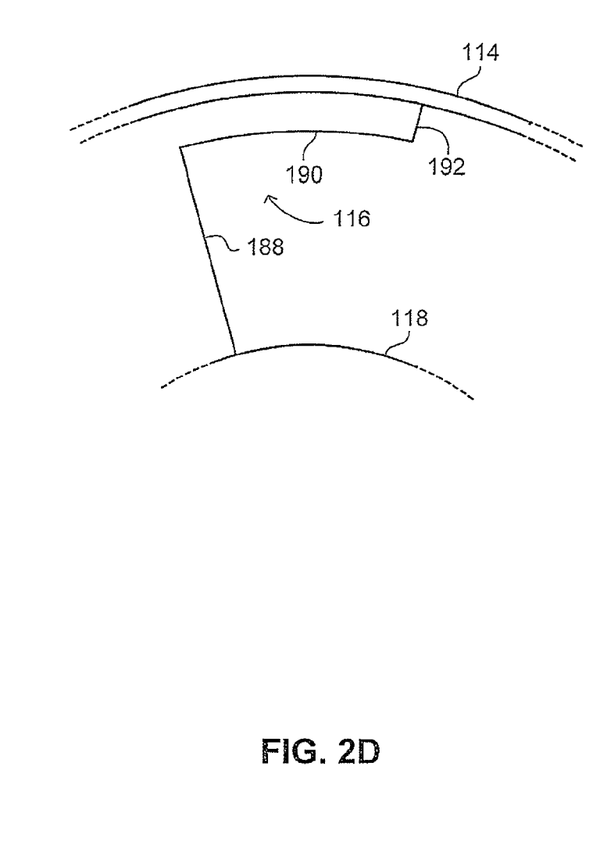
FIG. 2D is a schematic illustration of a close up look on a section of vibratory gyroscopic device 100.

Reference is no made to FIGS. 2A, 2B, 2C and 2D. FIG. 2D is a schematic illustration of a close up look on a section of vibratory gyroscopic device 100. The section of vibratory gyroscopic device 100 includes a section of ring 114, a section of central support 118 and one supporting spring from a pair of supporting springs 116. Each spring includes three sections. A radial section 188, an arched section 190 and a stub 192. One end of arched section 190 is coupled with one end of radial section 188 and the other end of arched section 190 is coupled with stub 192. The other end of radial section 188 is coupled with central support 118. The other end of stub 192 is coupled with ring 114. In general, when a spring is coupled to the ring, the spring affects the symmetry of the ring, and thus affects the resonant frequency thereof (i.e., distortion of resonant elliptic mode). In order to alleviate that affect on the resonant frequency, two measures are taken. The first alleviating measure is increasing the ratio between the length of radial section 188 and the length of stub 192 (i.e., typically, to approximately 30:1). The second alleviating measure is reducing the width of the spring relative to the width of the ring (i.e., indicated by arrow 186 in FIG. 2B).

As mentioned above, with reference to FIG. 2C, the rotation rate is determined by determining the magnitude of the Coriolis force exerted on a pulsated ring such as ring 114. The Coriolis force is determined by measuring the change in capacitance at node 158. Therefore, increasing the capacitance of capacitive sensor 126 increases the sensitivity thereof. The capacitance of capacitive sensor 126 is inversely proportional to the distance between capacitive sensor 126 and ring 114. Thus, in order to increase the capacitance of capacitive sensor 126, the distance between capacitive sensor 126 and ring 114 should be decreased. Referring back to FIG. 2B, in order to increase the sensitivity of capacitive sensor 126, the ratio between the thickness of ring 114, indicated by arrow 182, and the distance between ring 114 and the capacitive sensor 136, indicated by arrow 184, is high. Typically, this ratio is approximately 50:1.

Figure 3A:
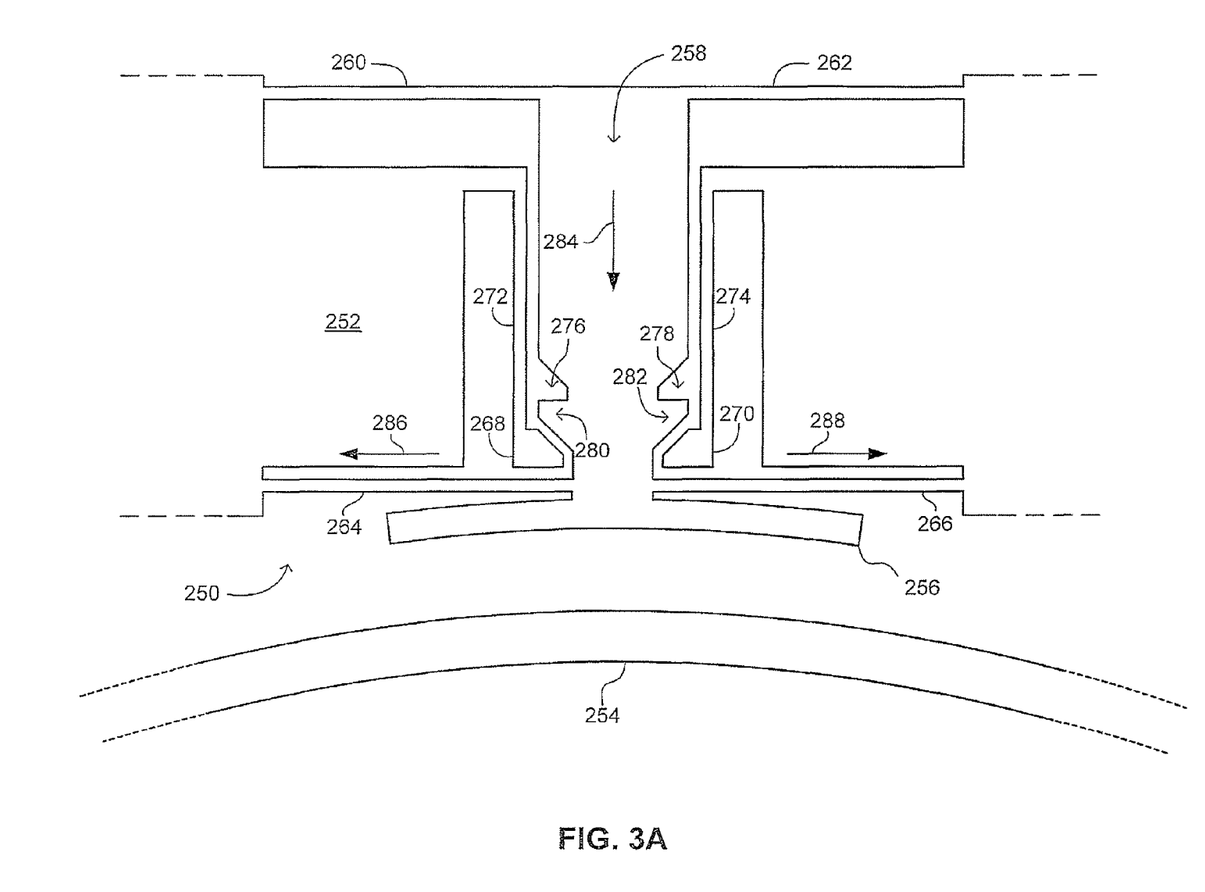
FIG. 3A and to FIG. 3B, are top views of latching assembly generally referenced 250, in a vibratory gyroscopic device, in accordance with another embodiment of the disclosed technique.

According to the disclosed technique, a high aspect ratio is achieved by coupling (i.e., during the manufacturing process) the capacitive sensor to a movable frame. As mentioned above, the movable frame latches from a manufacturing configuration to an operating configuration, in response to a force applied thereto (i.e., the movable frame moves to the operating configuration). A locking mechanism may secure the movable frame at the operating configuration. Consequently, it is possible to manufacture a vibratory gyroscope with a low aspect ratio and increase the aspect ratio after the manufacturing process by coupling the capacitive sensor to the movable frame, and moving the movable frame to the operating configuration after the manufacturing process. Reference is now made to FIG. 3A and to FIG. 3B, which are top views of latching assembly generally referenced 250, in a vibratory gyroscopic device, in accordance with another embodiment of the disclosed technique. Latching assembly 250 includes a capacitive sensor 256, a movable frame 258, frame springs 260, 262, 264 and 266, locking elements 268 and 270 and locking springs 272 and 274. Movable frame 258 includes therein, locking cavities 276 and 278 and displacing elements 280 and 282. In the currently described embodiment, springs 260, 262, 264 and 266, locking elements 268 and 270 and locking springs 272 and 274, locking cavities 276 and 278 and displacing elements 280 and 282 constitute the locking mechanism of latching assembly 250.

Figure 3B:
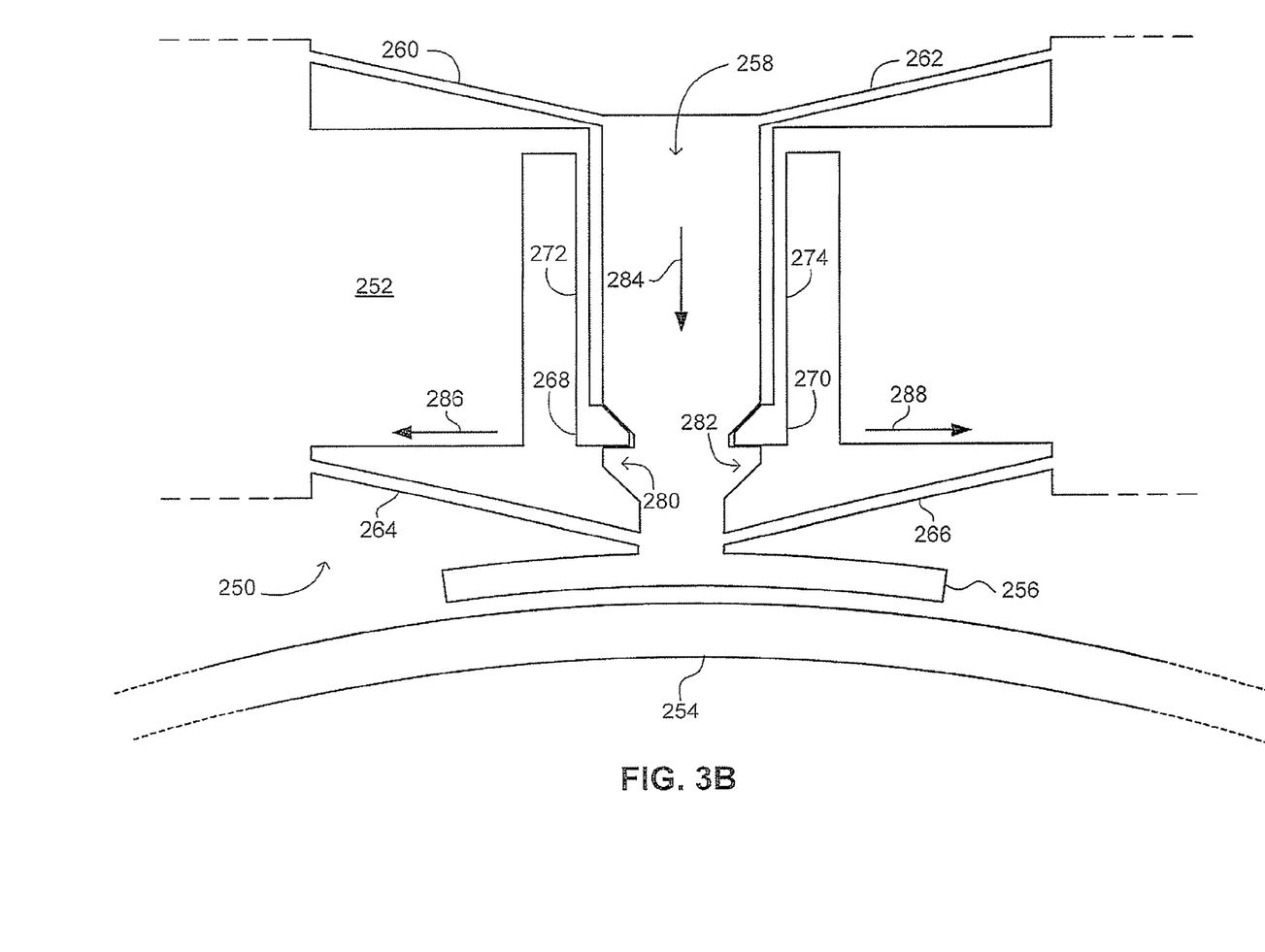

Capacitive sensor 256 is coupled with movable frame 258. Frame springs 260, 262, 264 and 266 couple movable frame 258 with a fabrication material slab 252. Locking springs 272 and 274 couple locking elements 268 and 270 with fabrication material slab 252, respectively.

When a force (e.g., a mechanical force, a magnetic force or an electrical force) is applied to movable frame 258 in the direction of arrow 284, movable frame 258, and thus capacitive sensor 256, move in the direction of arrow 284, toward ring 254. As movable frame moves in the direction of arrow 284, displacing element 280 displaces locking element 268 in the direction of arrow 286, and displacing element 282 displaces locking element 270 in the direction arrow 288. During this displacement of locking elements 268 and 270, locking spring 272 applies a force on locking elements 268, in the direction of arrow 288 and locking spring 274 applies a force on locking element 270 in the direction of arrow 286. When locking element 268 is aligned with locking cavity 276, locking element 268 slides into locking cavity 276. When locking element 270 is aligned with locking cavity 278, locking element 270 slides into locking cavity 278. Furthermore, frame springs 260, 262, 264 and 266 apply a force in a direction opposite to the direction of arrow 284, on moveable frame 258. However, displacing elements 280 and 282 prevent movable frame 258, and consequently capacitive sensor 256, from returning to the former position thereof, thereby locking capacitive sensor 256 at the operating configuration thereof.

As a consequence of the motion and locking of movable frame 258, the distance between capacitive sensor 256 and ring 254 is reduced and the capacity of capacitive sensor 256 is increased. Thus, a sensor with a low aspect ratio is manufactured and the aspect ratio is increased after the manufacturing process.

According to a further embodiment of the disclosed technique, the locking mechanism is the friction between movable frame 258 and the substrate. The locking mechanism my further be a magnetic or an electric force applied to the movable frame, to prevent movable frame 258 from moving.

Figure 4:
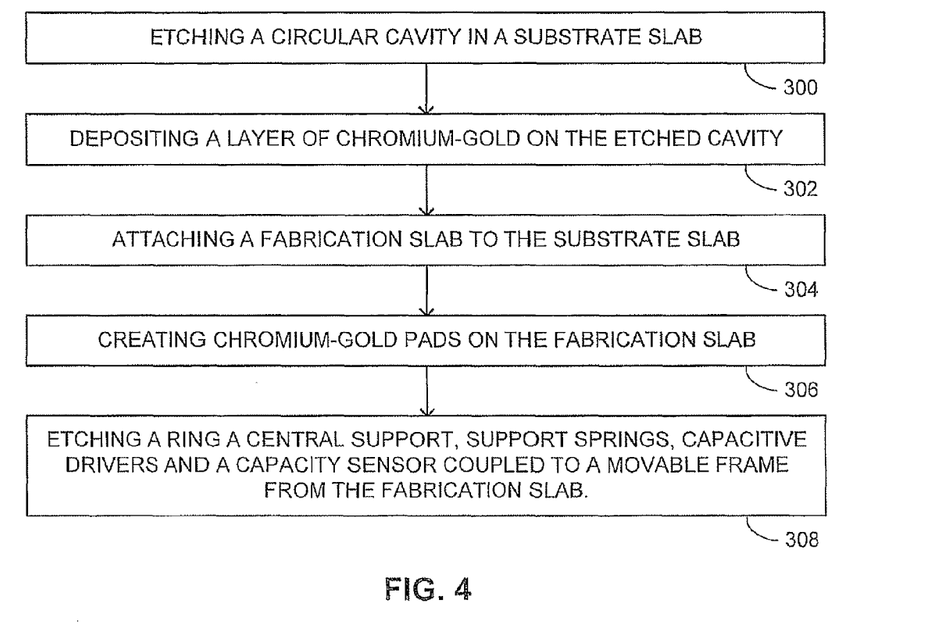
FIG. 4, is a schematic illustrations of a method for manufacturing a vibratory gyro in accordance with a further embodiment of the disclosed technique.
Figure 5A:
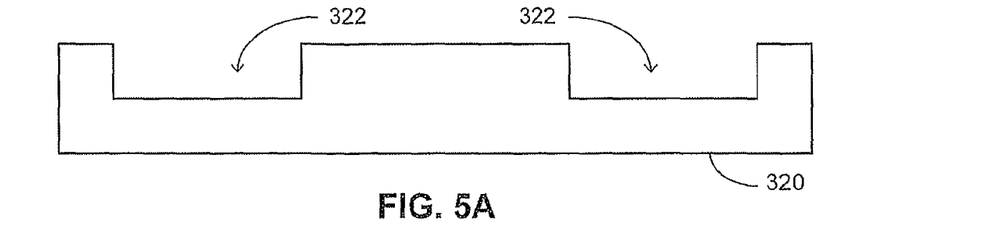
FIGS. 5A, 5B, 5C, 5D and 5E are side views of the manufacturing stages of a vibratory gyroscope generally referenced 320.

Reference is now made to FIG. 4, and to FIGS. 5A, 5B, 5C, 5D and 5E, which are schematic illustrations of a method for manufacturing a vibratory gyro in accordance with a further embodiment of the disclosed technique. FIGS. 5A, 5B, 5C, 5D and 5E are side views of the manufacturing stages of a vibratory gyroscope generally referenced 320. In procedure 300, a ring-shaped cavity is etched into a substrate slab. Initially, a pattern defining layer (e.g., a photo resistive material, not shown) is deposited on the substrate slab according to the desired contour pattern of the cavity. The cavity is then etched out of the substrate slab using, for example, Reactive Ion Etching (RIE) technique according to the pattern defining layer. During the RIE processes, a jet of ions removes atoms of the treated material (e.g., the substrate slab). The depth of the cavity is on the order of several micrometers (e.g., 10 micrometers). The substrate slab is then cleaned. With reference to FIG. 5A, a circular cavity 322 is etched into substrate slab 320.

Figure 5B:
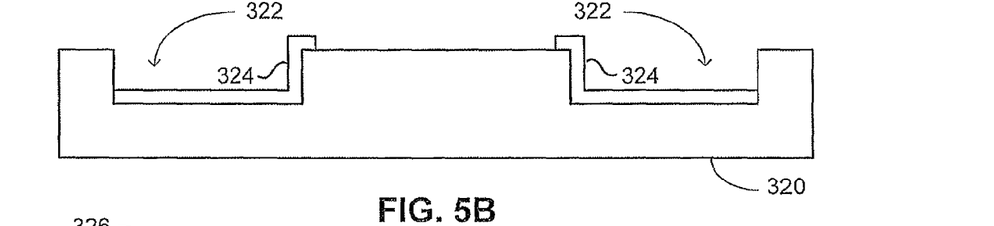

In procedure 302, a layer of metal (e.g., chromium, titanium, tantalum, platinum) is deposited onto the etched cavity. The metal layer prevents the accumulation of residual charge on the substrate slab in later stages of the manufacturing process. Before the metal layer is deposited, a pattern defining layer, defining the desired pattern of metal is deposited on the substrate slab. A layer of metal is deposited onto the pattern defining layer (e.g., by evaporating the metal onto the pattern defining layer). The pattern defining layer is then lifted off the substrate slab with the metal deposited on the pattern defining layer, thereby, leaving a layer of metal only on desired locations on the substrate slab. The pattern defining layer is deposited on the sides and the bottom of the cavity. The thickness of the metal layer is on the order of hundreds of Angstroms (e.g., 320 Å to 500 Å). The substrate slab and the metal layer are then cleaned. With reference to FIG. 5B, a layer 324 of metal is deposited on the sides and the bottom of cavity 322.

Figure 5C:
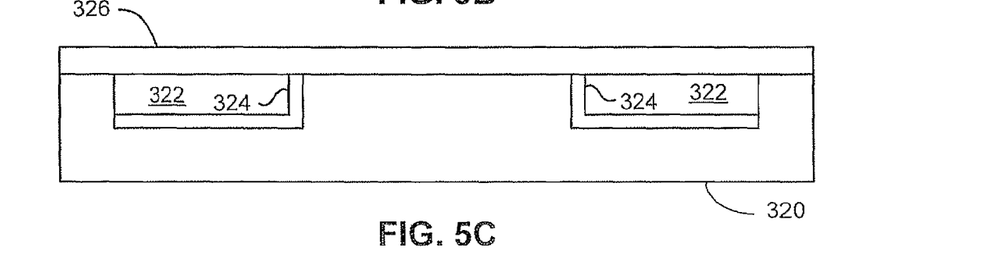

In procedure 304, a fabrication material slab is attached to the substrate slab. For example, the fabrication material slab is anodically bonded to the substrate slab. The fabrication material slab may be formed, for example, of single crystalline silicon. With reference to FIG. 5C, fabrication material slab 326 is anodically bonded on top of substrate slab 320 (i.e., according to the anodic bonding process).

Figure 5D:
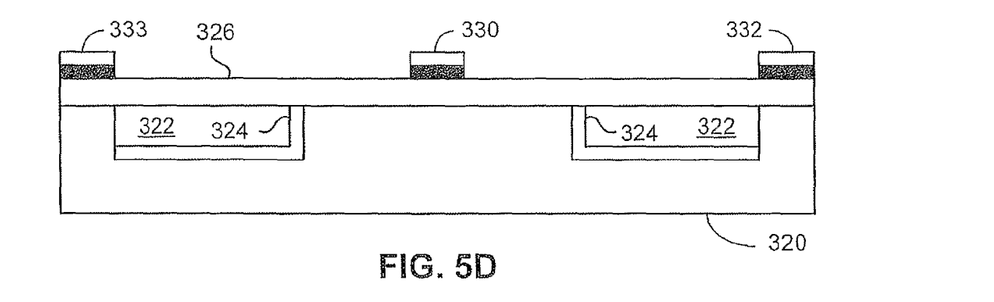

In procedure 306, chromium-gold pads are created onto the fabrication material slab. First, a pattern defining layer (riot shown) is deposited onto the fabrication material slab. Before the chromium-gold layer is deposited, the pattern defining layer, defining the desired pattern of the chromium-gold pads is deposited on the fabrication material. A layer of chromium-gold is then evaporated on the photo resistive material and the fabrication material slab. Then, the pattern defining layer is lifted off the fabrication material slab with the chromium-gold deposited on the pattern defining layer, thereby, leaving a layer of chromium-gold only on desired locations on the substrate slab. With reference to FIG. 5D, chromium-gold pads 333, 330 and 332 are created onto fabrication material slab 326.

Figure 5E:
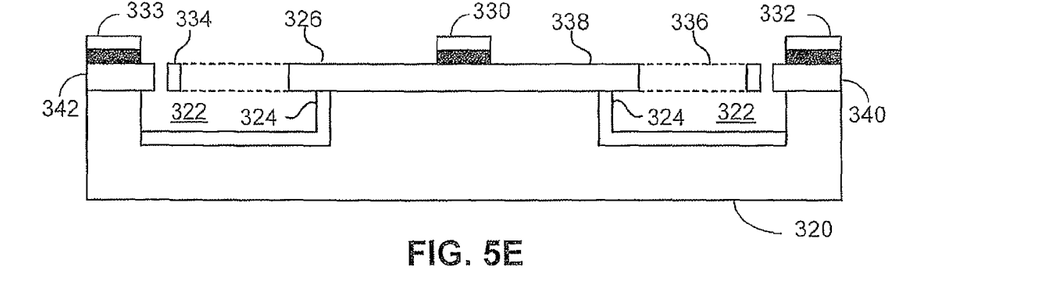

In procedure 308, a ring, supporting springs, a central support, capacitive actuators, a capacitive sensor and a movable frame are etched from the fabrication material slab using, for example, Deep RIE (DRIE) technique. Initially a layer (not shown) of silicon oxide ($SiO_2$) is evaporated over the fabrication material slab using Plasma-Enhanced Chemical Vapor Deposition (PECVD). A pattern defining layer, defining the desired pattern of a ring, supporting springs, a central support, capacitive actuators, a capacitive sensor and a movable frame, is deposited on the $SiO_2$. The $SiO_2$ layer is etched, according to the pattern of the photo resistive material, using the PIE technique. The fabrication material slab is also etched according to the same pattern created by the $SiO_2$ layer using the DRIE technique. The $SiO_2$ is then removed. When the DRIE process is applied to the fabrication material slab, ions, and consequently a residual charge may accumulate on the substrate slab, causing the jet of ions to deflect. As mentioned above, in conjunction with procedure 302, a metal layer prevents this accumulation of charge by connecting that metal layer to ground. With reference to FIG. 5E, ring 334, supporting springs 336, central support 338, capacitive actuators 340, a capacitive sensor 342 and a movable frame (not shown) are etched from the fabrication material slab 324.

It will be appreciated by persons skilled in the art that the disclosed technique is not limited to what has been particularly shown and described hereinabove. Rather the scope of the disclosed technique is defined only by the claims, which follow.

The invention claimed is:

1. A latching assembly for decreasing an aspect ratio between a capacitive sensor and a ring in a vibratory gyroscopic device, the device includes a substrate, the ring, at least one capacitive actuator and at least one capacitive sensor, a central support having a diameter smaller than a diameter of the ring and a plurality of support springs, the central support being coupled with the substrate, the support springs being coupled with the central support and with the ring, the at least one capacitive actuator being coupled with the substrate and capacitively coupled with the ring, for applying an oscillating electric force on the ring, a frequency of the oscillating electric force being an elliptic mode frequency of the ring, the capacitive sensor being capacitively coupled with the ring, for sensing the changes in capacitance between the ring and the at least one capacitive sensor, the assembly comprising:

a movable frame coupled with said capacitive sensor, said movable frame latches from a manufacturing configuration to an operating configuration in response to a force applied thereto, wherein an aspect ratio at the manufacturing configuration is lower than an aspect ratio at the operating configuration.

2. The assembly according to claim 1, wherein said movable frame latches to said operating configuration in response to a mechanical force applied thereto.

3. The assembly according to claim 1, wherein said movable frame latches to said operating configuration in response to an electrical force applied thereto.

4. The assembly according to claim 1, wherein said movable frame latches to said operating configuration in response to a magnetic force applied thereto.

5. The assembly according to claim 1, wherein said device further includes a locking mechanism for securing said movable frame at said operating configuration.

6. The assembly according to claim 5, wherein said movable frame includes at least one locking cavity and at least one displacing element.

7. The assembly according to claim 6, wherein said locking mechanism includes:

at least one locking spring coupled with said substrate;

at least one frame spring coupled with said movable frame and with said substrate for exerting a force opposite to a direction of motion of said movable frame, wherein when said movable frame latches to said operating configuration, said at least one displacing element displaces said at least one locking spring, said at least one locking spring slides into said at least one locking cavity when aligned therewith thereby securing said movable frame at said operating configuration.

8. The device according to claim 5, wherein said locking mechanism is a friction between said movable frame and said substrate.

9. The device according to claim 5, wherein said locking mechanism is a magnetic locking mechanism.

10. The device according to claim 5, wherein said locking mechanism is an electric locking mechanism.

11. The device according to claim 1, wherein said aspect ratio at said operating configuration is 50:1.

12. A vibratory gyroscopic device comprising:

a substrate;

a central support coupled with said substrate;

a ring having an inner diameter larger than a diameter of said central support;

a plurality of supporting springs coupled with said central support and with said ring;

at least one capacitive actuator coupled with said substrate and capacitively coupled with said ring for applying an oscillating electric force on said ring, a frequency of said oscillating electric force being an elliptic mode frequency of said ring;

at least one capacitive sensor capacitively coupled with said ring for sensing the changes in capacitance between said ring and said at least one capacitive sensor; and a movable frame coupled with said capacitive sensor, said movable frame latches from a manufacturing configuration to an operating configuration in response to a force applied thereto, wherein an aspect ratio at said manufacturing configuration is lower than an aspect ratio at said operating configuration.

13. The device according to claim 12, wherein said supporting springs are arranged in pairs; the supporting springs of each of said pair of spring exhibits bilateral symmetry relative to each other.

14. The device according to claim 13, wherein each of said supporting springs includes a radial section, an arched section and a stub, one end of said arched section is coupled with one end of said radial section, the other end of said radial section is coupled with one end of said stub, the other end of said radial section is coupled with said central support, the other end of said stub is coupled with said ring.

15. The device according to claim 14, wherein a ratio between a length of the radial section and a length of the stub is substantially 30:1.

16. The device according to claim 12, wherein a ratio between a thickness of the spring to a width of said spring is 100:15.

17. The device according to claim 12, wherein another capacitive sensor, coupled with said substrate and capacitively coupled with said ring, for sensing an elliptic mode vibration of said ring, said another capacitive sensor is placed opposite said at least one capacitive actuator.

18. The device according to claim 12, wherein another capacitive sensor, coupled with another movable frame and capacitively coupled with said ring, for sensing an elliptic mode vibration of said ring, said another capacitive sensor is placed opposite said at least one capacitive actuator, said another movable frame latches from another manufacturing configuration to another operating configuration.

19. The device according to claim 12, wherein another capacitive actuator, coupled with said substrate and capacitively coupled with said ring is place opposite said at least one capacitive sensor for nulling a radial vibration of a node location.

20. The device according to claim 19, wherein said another capacitive actuator substantially rapidly nulls said radial vibration of said node location by applying an electric force on said ring, thereby, decreasing the time of a mechanical response of said ring to changes in the Coriolis force exerted on said ring when said ring elliptically vibrates and said device rotates, said electric force is determined according to the radial vibration sensed by said at least one capacitive sensor.

21. The device according to claim 12, wherein a plurality of compensating electrodes, coupled with said substrate and capacitively coupled with said ring, said plurality of compensating electrode are place around a perimeter of said ring, said compensating electrodes apply an electric force on said ring for compensating deviations in the motion of said ring, said deviations being due to imperfections in the structure of said ring.

22. The device according to claim 12, wherein said aspect ratio at said operating configuration is substantially 50:1.

23. The device according to claim 12, wherein said substrate is made of glass wool.

24. The device according to claim 12, wherein said ring, said plurality of springs, said central support, said at least one capacitive actuator, said at least one capacitive sensor and said moving device are made of silicon.

25. The device according to claim 12, wherein said movable frame moves to said operating configuration in response to a mechanical force applied thereto.

26. The device according to claim 12, wherein said movable frame moves to said operating configuration according to an electrical force applied thereto.

27. The device according to claim 12, wherein said movable frame moves to said operating configuration in response to a magnetic force applied thereto.

28. The device according to claim 12, wherein said device further includes a locking mechanism for securing said movable frame at said operating configuration.

29. The device according to claim 28, wherein said movable frame includes at least one locking cavity and at least one displacing element.

30. The device according to claim 29 wherein said locking mechanism includes:
at least one locking spring coupled with said substrate;
at least one frame spring coupled with said movable frame and with said substrate for exerting a force opposite to the direction of motion of said movable frame,
wherein when said movable frame latches to said operating configuration, said at least one displacing element displaces said at least one locking spring, said at least one locking spring slides into said at least one locking cavity when aligned therewith, thereby securing said movable frame at said operating configuration.

31. The device according to claim 28, wherein said locking mechanism is a friction between said movable frame and said substrate.

32. The device according to claim 28, wherein said locking mechanism is a magnetic locking mechanism.

33. The device according to claim 28, wherein said locking mechanism is an electric locking mechanism.

* * * * *